Figure 1:
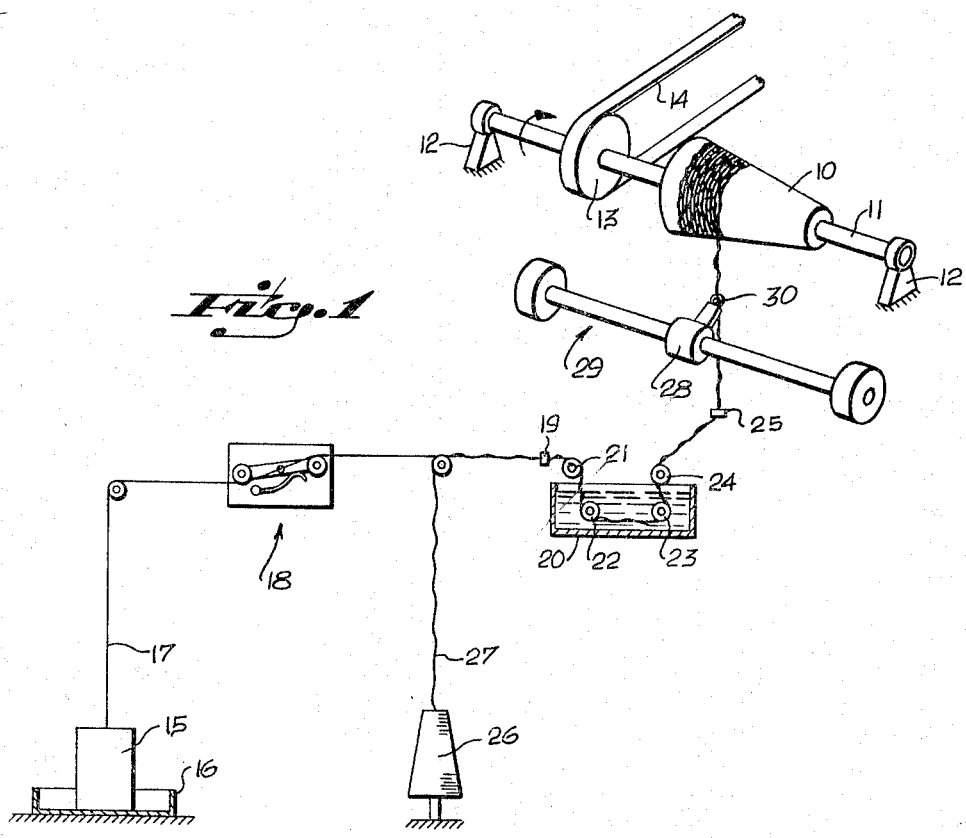

INVENTOR.
WALTER G. WEIL
BY James J Cannon.

ATTORNEY.

United States Patent Office 3,320,977
Patented May 23, 1967

3,320,977
METHOD OF MAKING HOLLOW SHAPES OF RESIN-IMPREGNATED GLASS FIBER, AND HOLLOW SHAPE RESULTING THEREFROM
Walter G. Weil, 12 Stoneledge Road, Upper Saddle River, N.J. 07458
Filed Sept. 22, 1964, Ser. No. 398,357
2 Claims. (Cl. 138—129)

This invention relates to the manufacture of seamless hollow shapes by winding resin-impregnated glass fiber yarn about a revolving core, and is directed particularly to a method of producing a parallel pattern winding shape of greatly improved strength in the axial direction.

The method of producing hollow shapes, such as seamless lamp shades, by winding a single yarn of resin-impregnated glass fibers on a rotating core is described in U.S. Patent Number 3,084,087, issued Apr. 2, 1962, to Walter G. Weil and Robert L. Jackson. In that method the yarn is helically wound back and forth with a wide pitch, thereby producing a basket weave effect. In this structure, the resin bonding the many crossing junctures of the glass fiber yarn winding give the desired strength to the finished shape along the longitudinal axis or axis of symmetry.

It is desirable, in order to produce shapes of finer texture, such as lamp shades simulating better quality fabric shades, to wind the resin-impregnated and coated glass fiber yarn on the core or form continuously from one end to the other in abutting parallel loops. However, since such structure depends for its longitudinal strength only upon the bridges of cured resin bonding the parallel winding loops, it will rupture readily when longitudinal tension or bending forces are applied. Attempts to overcome this deficiency by building up a heavier shade with a plurality of layers one over the other have proven to be unsatisfactory not only because this resulted in a comparatively opaque shade yielding poor quality illumination, but also because of the additional material and labor costs involved.

It is accordingly the principal object of my invention to provide a new and improved method for producing hollow shapes of single-layer, parallel-wound, resin-impregnated glass fiber yarn having superior strength characteristics along the longitudinal axis. To this end, a salient feature of my process resides in the utilization of a plurality, preferably two, glass fiber yarns or strands wound together in close juxtaposition, at least one strand of which is wound with substantially less tension than another. By this method of winding, it has been found that many of the fibers of the strand or yarn under the less tension will be laterally displaced in a slightly wavy pattern in such a manner that individual glass fibers will criss-cross the comparatively straight fibers of the juxtaposed yarns or strands to provide strong bonding junctures with the resin when cured. These crossing fiber junctures, though great in number, are individually so small in size as to be practically invisible. Their total effect, however, provides the necessary longitudinal tensile strength and bending resistance heretofore not achieved in fine textured hollow shapes of parallel-wound, resin-impregnated glass fiber yarns, whereby for the first time it is possible to produce a glass fiber lamp shade that is durable, truly washable, and which has excellent translucency as compared with conventional lamp shades or globes.

Figure 2:
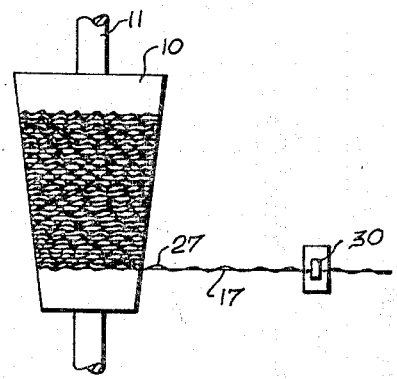

Other objects, features and advantages of the invention will be apparent from the following description when read with reference to the accompanying drawings. In the drawings:

FIG. 1 illustrates a simplified mechanism for carrying out the process embodying the invention; and FIG. 2 is a fragmentary view showing the form and winding yarns as seen from the top.

In FIGS. 1 and 2, 10 designates a form, which may be of wood, for example, for a lamp shade in the shape of a conic frustum, which is thus of circular cross-section perpendicular to its axis at any point therealong. The form 10 is supported for rotation on a spindle 11 journaled in journal blocks 12. The spindle 11 may be rotated in the direction indicated by a pulley 13 and motor (not illustrated) through belt 14 (partially shown). A creel 15 supported on a holder 16 contains fiber glass strand in bulk, preferably in the form of a roving strand 17, which passes therefrom through any conventional adjustable tensioning device, indicated generally at 18, and thence through a fixed eyelet 19, whence it dips into a synthetic resin supply tank 20 over roller 21, under rollers 22 and 23, and over roller 24. A spool of glass fiber yarn 26 provides a second strand 27 which is fed untensioned through the fixed eyelet 19 where it is brought together with the tensioned strand 17 for simultaneous passage through the resin supply tank 20. Upon leaving the resin tank, the parallel, resin-impregnated and coated strands 17 and 27 pass first through a fixed guide eyelet 25 and then through an eyelet 30 on the guide member 28 of a traversing mechanism 29. As the form 10 rotates, the traversing mechanism 29 moves the parallel strands 17 and 27 from left to right (as seen in FIG. 1), in closely-spaced helical relation. The glass fibers of the untensioned strand 27 will, as is shown greatly exaggerated in the drawing, cross-cross the fibers of the tensioned strand 17 to provide a great multitude of crossing fiber junctures which, when bonded by the cured resin, result in the desired axial strength in the finished shape. This remains true even though the resulting shape is made up of only one layer of parallel strands by traversing once across the form or core 10 in the production of delicate, yet durable, lamp shades of high quality and translucency.

While I have illustrated and described herein only one form in which my invention may conveniently be practiced, it is to be understood that this form is presented by way of example only and not in a limiting sense. For example, although I have described my method particularly with respect to the production of frusto-conical shape it will be understood that, by providing winding cores of different shape, other hollow shapes in the finished product could as readily be obtained, such, for example, as oval or polygonal, either of constant or increasing size along their lengths. The invention, in brief, is limited only by the scope and spirit of the following claims.

What I claim as new and desire to secure by Letters Patent is:

1. A hollow shape comprising a first glass fiber strand and a second glass fiber strand spirally wound to form a hollow shape, said strands being disposed together in a continuous series of closely-spaced, abutting loops, one of said glass fiber strands having laterally-extending portions along its length to overlie portions of the other of said strands, and a bonding material fixing the junctures between said strands at said overlying portions.

2. The method of forming hollow shapes which comprises rotating a form in the shape of the hollow shape to be produced, coating a pair of glass fiber strands with synthetic resinous material, winding said strands together from one end to the other around said form while maintaining one strand under greater tension than the other strand, said differential tensions causing one strand to form a continuous series of closely-spaced, abutting loops with the other strand, and then curing the wound and coated strands, said coating thereby bonding the strands together where they abut.

References Cited by the Examiner

UNITED STATES PATENTS 3,013,379 12/1961 Breen _____ 28—72
3,084,087 4/1963 Weil et al. _____ 240—108 X LAVERNE D. GEIGER, *Primary Examiner.*

C. L. HOUCK, *Assistant Examiner.*